No. 674,437. Patented May 21, 1901.
W. DARLING.
TRAP NEST.
(Application filed Oct. 4, 1900.)
(No Model.) 2 Sheets—Sheet 2.
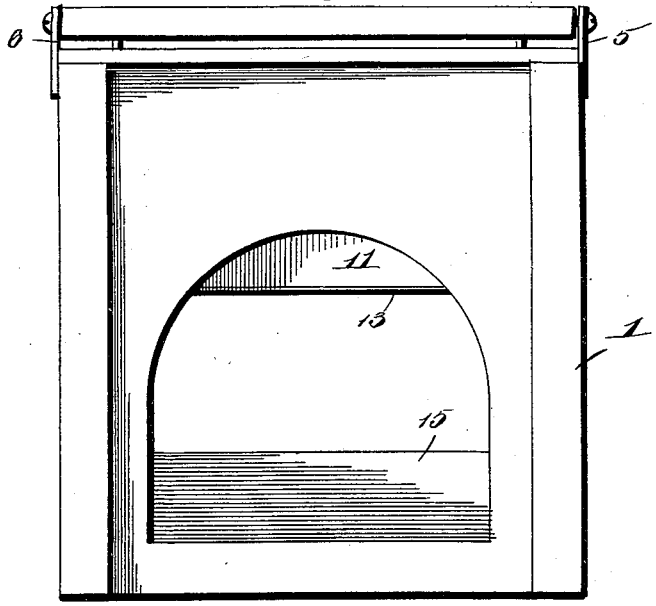
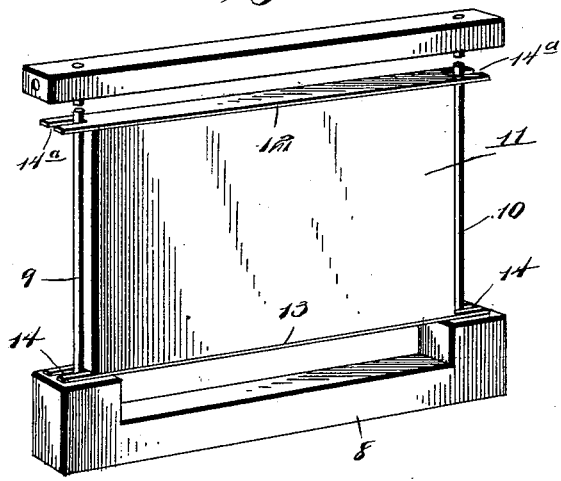
WITNESSES
Louis D. Heinrichs
B. F. Funk
INVENTOR
Winfield Darling
By Victor J. Evans, Attorney

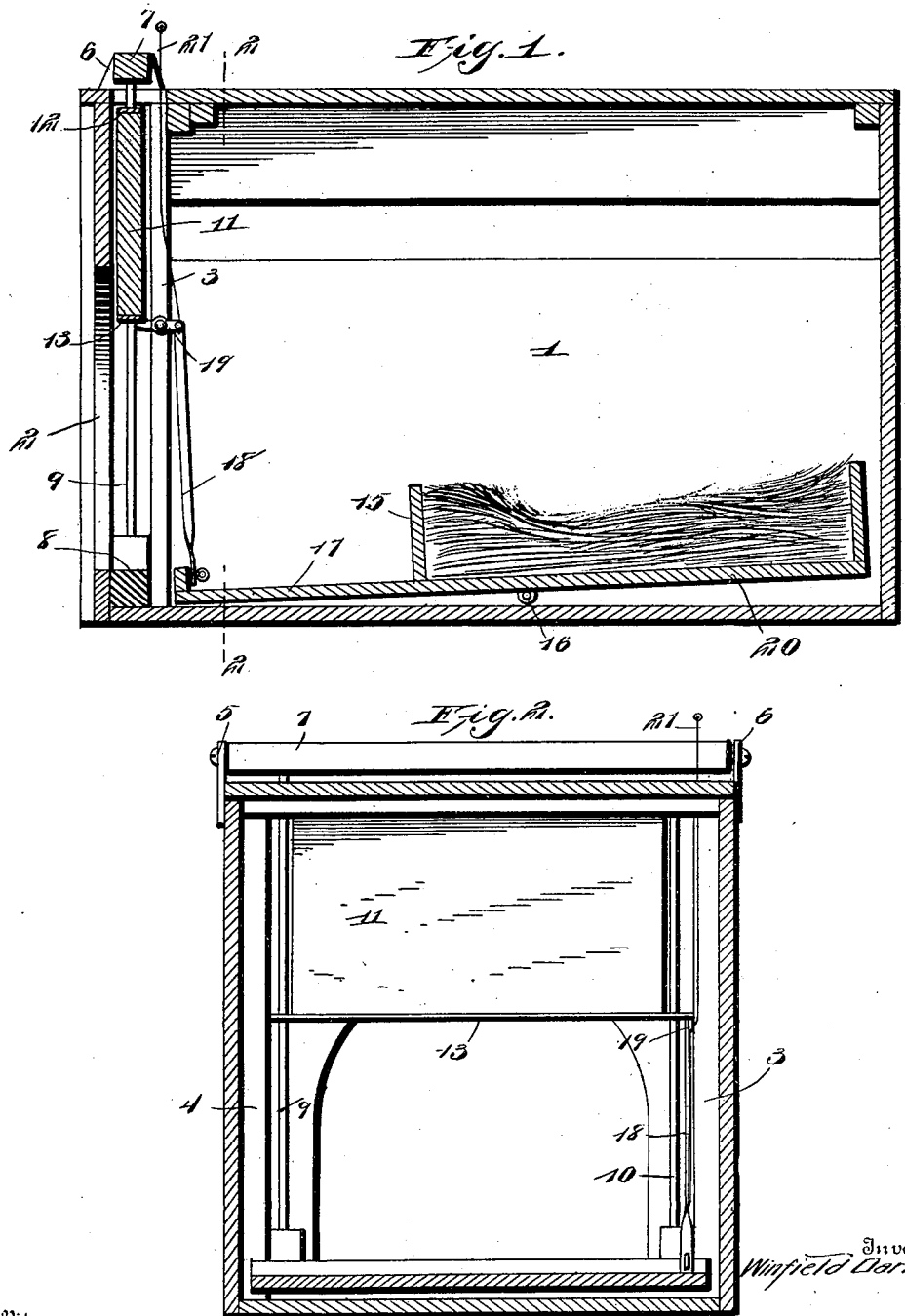

UNITED STATES PATENT OFFICE.

WINFIELD DARLING, OF SOUTH SETAUKET, NEW YORK.

TRAP-NEST.

SPECIFICATION forming part of Letters Patent No. 674,437, dated May 21, 1901.

Application filed October 4, 1900. Serial No. 32,026. (No model.)

*To all whom it may concern:*

Be it known that I, WINFIELD DARLING, a citizen of the United States, residing at South Setauket, in the county of Suffolk and State of New York, have invented new and useful Improvements in Trap-Nests, of which the following is a specification.

This invention relates to the general class of nests, but more particularly to trap-nests; and the object thereof is to provide a cheap, durable, and efficient device of the character described which will entrap the fowl within an inclosure until manually released.

With this object in view my invention consists in certain parts and combinations of parts, all of which will be specifically described hereinafter, pointed out in the claim, and illustrated in the accompanying drawings, showing the preferred form of my invention, and in which—

Figure 1 is a vertical longitudinal sectional view of a nest constructed in accordance with my invention. Fig. 2 is a transverse sectional view on the line 2 2 of Fig. 1. Fig. 3 is a front elevation. Fig. 4 is a detail perspective view of the sliding gate, and Fig. 5 is a similar view of one of the arbors which supports the gate.

Referring now to the drawings by reference-numerals, 1 designates a substantially rectangular box closed except for its front end, which has an opening 2 to admit the fowl.

3 and 4 designate two vertical and parallel strips secured on either side of the box and adjacent to the walls of the front of the box to form guides for the gate mechanism, to be described hereinafter.

Interposed between the inner side of the box front and the strips just referred to is the gate mechanism, which is removably secured and suspended from the arbors 5 and 6 on the top of the box 1. This gate mechanism comprises two strips of suitable material 7 and 8, connected by vertical rods 9 and 10, forming a frame on which the gate 11 slides. This frame, it will be observed, hangs from the arbors 5 and 6 and remains rigid.

The top and bottom strips 12 and 13 on the gate 11 are provided at their respective ends with slots 14 and 14ª, which engage the vertical rods 9 and 10 to permit the gate to slide thereon and to prevent its displacement.

15 designates the nest proper, which comprises a box fulcrumed at 16 within the first-named box and is provided with an extended portion 17 at its forward end, to which is secured a link connection 18, pivoted to one end of a pivoted dog 19, fastened to one of the strips 3 or 4. The free end of the dog 19 will normally engage the bottom edge of the gate 11 to hold the same in a raised position and permit the entrance of the fowl to the nest. However, as soon as the said fowl enters the nest the weight thereof will lower the rear end of the bottom 20, from which projects the extension 17, and as the extended portion 17 is raised the dog 19 will be thrown out of engagement with the gate 11 and it will drop by gravity, thus impaling the fowl within the box 1 until released.

The cord 21, which is fastened to the dog 19 in rear of the pivoted point thereof, is designed to be utilized for the purpose of releasing the dog to permit the gate 11 to be raised.

While I have shown the preferred form of my invention, I do not limit myself thereto, as I am aware that modifications may be made therein without departing from the spirit or sacrificing any of the advantages thereof, and I therefore reserve the right to make all such changes as fairly fall within the scope of my invention.

I claim—

In a device of the character described, the combination with a box having an opening through which a fowl may be admitted, guiding-strips arranged on either side of the box and adjacent to the opening, a frame held against lateral displacement by the strips and having vertical rods on either side thereof, a sliding gate, slotted strips on the top and bottom of said gate which engage the rods, a pivoted dog, a pivoted nest and a connection between the nest and the dog whereby the gate will be held normally in a raised position, but so as to permit the gate to fall when a fowl enters the nest.

In testimony whereof I affix my signature in presence of two witnesses.

WINFIELD DARLING.

Witnesses:
 RUTH A. GRAY,
 J. L. HANKIS.